United States Patent [19]

Chick

[11] 4,434,115
[45] Feb. 28, 1984

[54] METHOD FOR REMOTE LINING OF SIDE CONNECTIONS

[75] Inventor: Douglas K. Chick, Elstree, England

[73] Assignee: Insituform International, Inc., Channel Islands

[21] Appl. No.: 348,072

[22] Filed: Feb. 11, 1982

[30] Foreign Application Priority Data

Feb. 18, 1981 [GB] United Kingdom ............... 8105126

[51] Int. Cl.³ .............................................. B29C 27/16
[52] U.S. Cl. .................... 264/36; 156/287; 156/294; 264/269; 264/516
[58] Field of Search ............... 264/36, 516, 269, 267; 156/294, 287

[56] References Cited

U.S. PATENT DOCUMENTS

| | | | |
|---|---|---|---|
| 4,368,091 | 1/1983 | Ontsuga et al. ........... | 264/269 X |
| 4,385,885 | 5/1983 | Wood ........................ | 264/36 X |
| 4,386,628 | 6/1983 | Stanley ..................... | 264/516 X |

FOREIGN PATENT DOCUMENTS

| | | | |
|---|---|---|---|
| 55-42823 | 3/1980 | Japan ....................... | 156/294 |
| 1449455 | 9/1976 | United Kingdom . | |

*Primary Examiner*—Donald E. Czaja
*Assistant Examiner*—James C. Housel
*Attorney, Agent, or Firm*—Fred Philpitt

[57] ABSTRACT

The method discloses the lining of a lateral connection to a pipeline. The method is by remotely inserting a unit in the pipeline and everting a flexible lining tube out of an outlet in the unit directly into the lateral connection. The lining may be a flexible lining which subsequently hardens to form a rigid pipe inside the connection. The eversion of the lining tube is by means of a fluid pressure differential.

7 Claims, 7 Drawing Figures

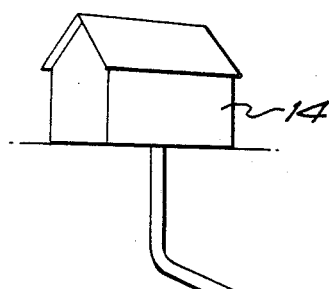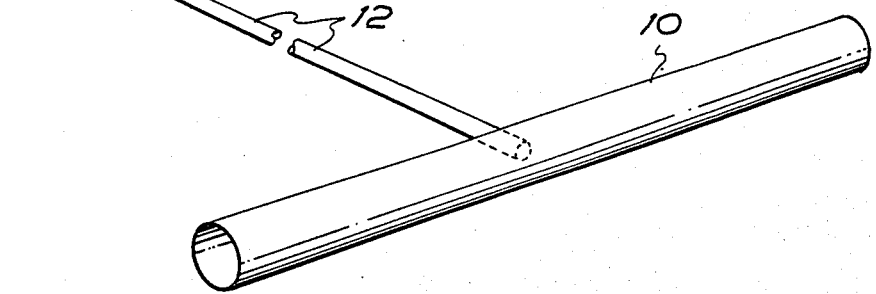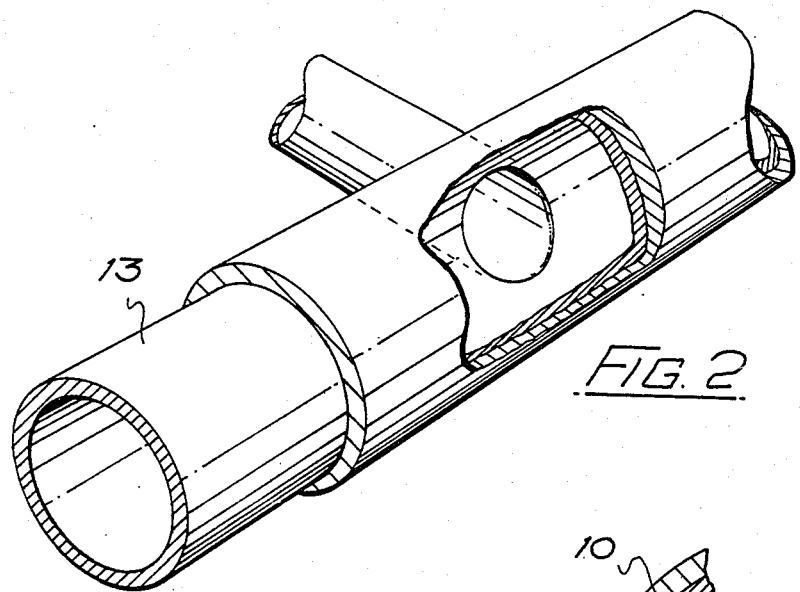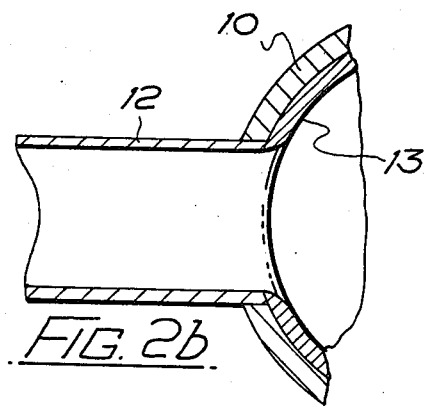
FIG.1
FIG.2
FIG.2b

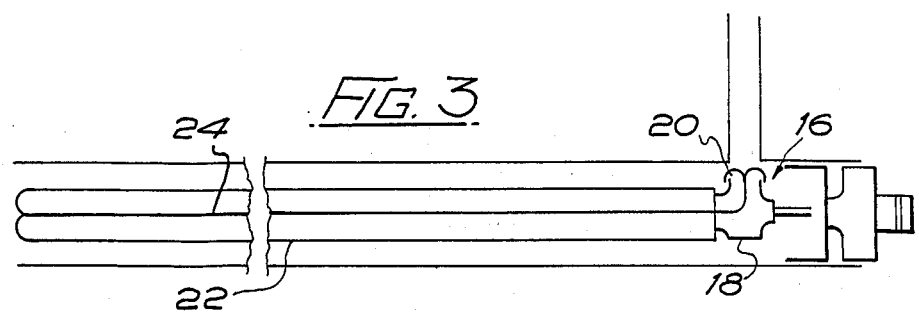
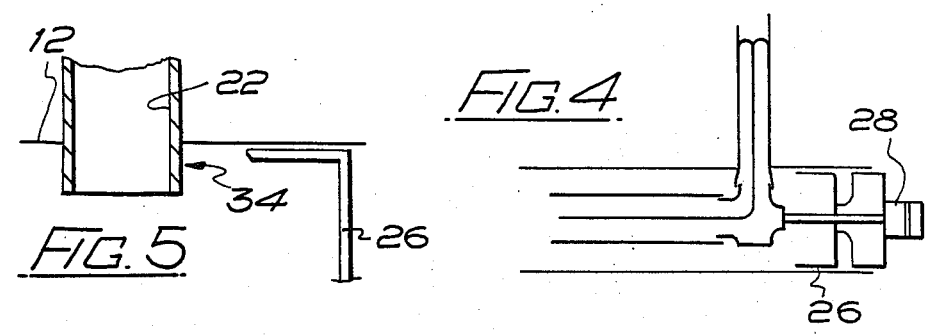
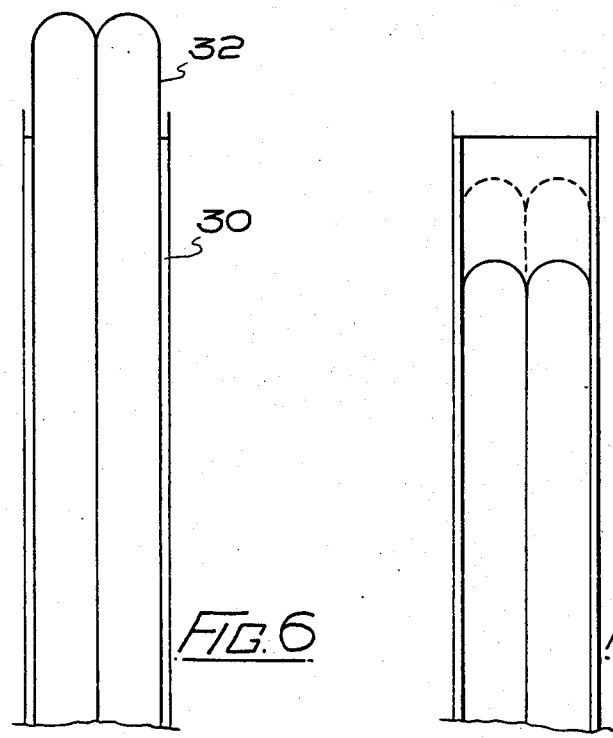

METHOD FOR REMOTE LINING OF SIDE CONNECTIONS

This invention relates to a method of lining pipelines in passageways which are known as "side connections" or "laterals".

To explain what is meant by these expressions, it is to be pointed out that we have invented a process for the lining of underground pipelines in passageways, and this process is known as the INSITUFORM (Trade Mark) process, and embodiments of the process are the subject of our British Pat. No's. 1,449,455 and 1,357,355. In this process, a flexible tube of resin absorbent material, suitably impregnated with resin, is placed in position lining the underground pipeline or passageway. The resin is subsequently cured, and a rigid lining pipe is therefore formed inside the pipeline or passageway in situ. The method is extremely effective for underground waste and sewerage pipes, which have fallen into a state of disrepair, because the hard rigid lining is self supporting, and prevents the ingress of water from the surrounding ground if the pipeline is located under the water table, and the egress of waste materials if the pipeline is located above the water table. The process has shown itself to be extremely successful and right for its time insofar as all over the world there are underground pipelines in a state of disrepair. The method has the advantage that it does not require the existing pipeline to be dug up, or a new pipeline to be laid.

However, as can be appreciated in the case of an underground sewer or wastpipe, the pipe has branch connections from individual consumers, such as private houses, offices, factories and the like so that the waste materials from such consumers can be discharged directly into the pipeline. When a lining process such as described above is carried out, the lining of course extends over the side connection aperture of the main pipe, blocking it off.

There is technology on cutting equipment available, and the portions of the lining covering the side connections can be cut away using this cutting equipment.

It has been discovered that there is also a need to line the lateral connections, because they may also be leaking and faulty, and the present invention is concerned with a method of and means for lining such lateral connections.

Some attempts have been made to line lateral connections, but these have been unsuccessful.

In accordance with the present invention, a method of lining a lateral connection to a pipeline comprises taking into the pipeline a unit having an outlet which can be lined up with the side connection opening, and everting out of that outlet a flexible tubular lining which diverts into and along the side connection, using a fluid pressure differential.

The invention provides the novel aspect that lining of the side connection takes place from inside the pipe, and preferably a television camera or other viewing means also located inside the pipe is used to facilitate alignment of the said outlet with the side connection opening.

The lining tube may be a resin absorbent material tube which is impregnated with the synthetic resin which can cure or be cured when positioned so as to form a permanent rigid lining in the side connection. The trailing end of such tube may be left open, and the eversion may be performed by means of plastic bag, in which case it is not necessary to enter the premises of the consumer whose side connection is being relined, which is of considerable advantage, because up to the present time, it has by and large been necessary when performing the relining of side connection to enter the consumer's premises, which of course is undesirable.

The method may also include locating in the passgeway a cutting mechanism for cutting off any projecting end of the liner which extends into the passageway.

The cutting unit may be operatively positioned in relation to the outlet device, so that any necessary cutting is performed readily, without difficulty.

The invention can be best described with reference to an embodiment thereof, and one embodiment is illustrated in the accompanying drawings, wherein:

FIG. 1 shows diagrammaticlly an underground pipeline and a branch connection thereto;

FIGS. 2a and 2b show the arrangement of FIG. 1, after the lining of the main pipeline;

FIG. 3 shows diagrammatically an apparatus located in the pipeline, for the lining of the side connection;

FIG. 4 shows the arrangement of FIG. 3 at a later stage of the lining operation;

FIG. 5 shows the inner end of the lateral before cutting off of the residual lining; and FIGS. 6 and 7 show the lateral during lining and after cure of the lining.

Referring to FIG. 1, in this FIG. there is shown an underground pipeline 10 to which is connected a branch connection 12. The branch connection 12 may be one of many connected to the pipe 10, and is shown as extending from a domestic house 14 to the pipe 10. The pipe 10 may therefore be a sewer pipe or a gas pipe, or it could even be a water supply pipe.

Assume that the branch pipe 12 is in a state of disrepair, and requires relining in order to provide a sealing effect. The pipe 12 may be in a state of disrepair if external water is leaking into the pipe 12 from the surrounding ground, or the medium being carried by the pipe is leaking through the pipe into the surrounding ground.

There is known a successful technique for the lining of pipes such as pipe 10, with a flexible lining material comprising an absorbent layer which is impregnated with a synthetic, curable resin, as set forth in British Pat. No. 1,449,455. The lining for the pipe 10 is everted along the inside of the pipe 10 by fluid pressure, and then is held urged to the shape of the pipe 10 by fluid pressure whilst the resin cures or is forcibly cured by heat. Heat can be applied by circulating hot water through the lining tube when it is in position. When the resin cures, the lining is a hard rigid layer which forms in effect a barrier to ingress and egress of liquids to and from the pipe 10. The portions of lining covering the side connections, such as side connection 12 are cut away once more to re-open the connections. When this process is carried out, frequently it is necessary also to reline the side connections, such as side connection 1, and this has required the lining crews to enter the domestic dwellings such as domestic dwelling 14 and to invert a lining tube suitable to line the side connecting tube 12 into the tube 12 to line same in much the same fashion as the main tube 10 was lined. This does present a problem that a portion of the lining tube which is inverted into the pipe 12 will prjoject into pipe 10, and when the curing of the impregnating resin is effected, the said projecting portion must be removed.

In accordance with the present invention, the novel approach to the lining of said connections is taken in that the lining tube is inserted into the side connection, from inside the pipe 10, which is shown as being provided with a lining 13, and FIG. 3 shows an arrangement whereby this can be achieved.

In the arrangement shown in FIGS. 3, 4, and 5 an apparatus 16 is positioned in the pipe 10, the apparatus comprises a casing 18 having an outlet aperture 20. The casing is secured to one end of a long pressure tube 22 in which the lining 24 for the side connection is placed, and the said lining 24 has one end turned back upon itself and secured to the outlet 18 (as shown). The casing 18 and pressure tube 22 may be mounted on suitable skids for rollers to enable the entire apparatus 16 to be moved along the inside of the pipe 10, and it may also be provided with means whereby the assembly can be anchored in position e.g. by the use of wedging plungers which are forced radially outwards against the wall of the pipe 10 when the outlet is in register with the side connection. Additionally, the casing 18 supports a cutter 26 and ram 28 device for the purpose to be explained.

In order to reline the side connection it is simply a matter of forcing into the pressure tube 22 a liquid or other fluid under pressure to force the lining tube 22 to evert out of the outlet, and into the side connection pipe 12 as shown clearly in FIG. 4, so that the lining proceeds as set forth in British Pat. No. 1,449,455. The end of the lining may be held back by means of a rope so that it everts into the side connection tube at a controlled rate, and when the lining 24 is in position, hot water may be circulated through the inverted lining in order to cure the synthetic resin which impregnates the absorbent layer of the lining 24.

In a particular arrangement shown in FIGS. 6 and 7, the absorbent layer 30 of lining 24 can be contained in a flexible impermeable tube 32 which can subsequently be stripped from the absorbent layer 30 as shown in FIG. 7, so that in fact the absorbent layer 30 which is impregnated with resin, and which forms the final lining pipe, can be made open ended, whereby additional finishing work inside the connection pipe is unnecessary. In the alternative, it is possible to allow the lining tube to evert into the domestic dwelling, so that the end of the lining reporting at the house 14 can be cut off to complete the work.

At the inner end of the side connection 12, if a portion of the lining 24 still projects into the pipe 10, the cutter device 26 can then be activated in order to cut away the residual lining as shown at 34 in FIG. 5 in order to provide a smooth interior surface to the pipeline 10, with the end of the side connection lining being shaped to the contour of the opening of the side connection into the pipe 10.

Although the invention has particular application to the utilization of resin impregnated liners, it is to be mentioned that this invention can be applied to the lining of side connections with any suitable lining tube.

For the positioning of the casing in the correct angular disposition, the apparatus may be provided with a television camera whereby its position can be monitored from above ground level. The TV camera or other inspecting device may in the alternative be mounted on a separate chassis in the pipe 10. An extremely effective method for the lining of side connections is therefore provided, and in particular cases of the invention, it is not necessary to enter the premises to which the side connection extends.

When the side connection lining is an absorbent felt, this may suitably be a polyester felt, and the resin used for the impregnating of the felt may be a polyester based resin or an epoxy based resin. When the felt is provided externally with a coating film, then the film will form a smooth interior to the side connection, but in such cases it will be necessary to trim the end of the lining at the connection of the side connection with the premises, when lining of the side connection has been completed and the resin has cured hard.

I claim:

1. A method of lining the interior of a lateral pipe that extends laterally with respect to an elongated substantially horizontal underground pipeline and which lateral pipe opens into the side of said substantially horizontal underground pipeline by means of a side connection opening in said pipeline, which method comprises
    (a) introducing into the interior of said substantially horizontal underground pipeline an elongated liner tube everting unit, so that the length direction of the liner tube everting unit is aligned with the length direction of the pipeline,
    (b) from a control point located outside of said horizontal underground pipeline causing said liner tube everting unit to move along the interior of said substantially horizontal underground pipeline to a position which is near said side connection opening,
    (c) from a control point located outside of said horizontal underground pipeline aligning a liner tube everting outlet on said liner tube everting unit with said side connection opening, and
    (d) employing a fluid pressure differential to evert a flexible extendible liner tube laterally from said liner tube everting unit
        (1) first through said side connection opening, and
        (2) then progressively along the interior of said lateral pipe.

2. A method according to claim 1, wherein said liner tube includes resin absorbent material impregnated with curable synthetic resin, the liner tube being held against the interior walls of said lateral pipe by fluid pressure until the resin has cured sufficiently to enable said liner to be self-supporting.

3. A method according to claim 2, wherein heat is used to effect the cure of the resin.

4. A method according to claim 1 or 2 or 3, wherein said liner comprises a tube of resin absorbent felt impregnated with a curable resin and an outer flexible membrane which initially is to the outside of the felt, but after eversion is to the inside of the felt.

5. A method according to claim 4 wherein said flexible membrane is detached from the felt after the resin has cured sufficiently to enable the liner to be free standing.

6. A method according to claim 4 wherein said resin absorbent tube is open ended so that when the flexible membrane is removed, the hard resin tube has open ends.

7. A method according to claim 1 which additionally includes the step of cutting off any excess of the liner which projects into the interior of the pipeline.

* * * * *